US008411312B2

(12) United States Patent
Kanzawa

(10) Patent No.: US 8,411,312 B2

(45) Date of Patent: Apr. 2, 2013

(54) IMAGE FORMING APPARATUS, IMPOSITION METHOD FOR BOOKLET-SHAPED PRINTS, AND BOOKLET-SHAPED PRINTS

(75) Inventor: Motoki Kanzawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1344 days.

(21) Appl. No.: 12/128,223

(22) Filed: May 28, 2008

(65) Prior Publication Data

US 2009/0127843 A1 May 21, 2009

(30) Foreign Application Priority Data

Nov. 19, 2007 (JP) ................................. 2007-298930

(51) Int. Cl.
*G06K 15/00* (2006.01)
*G06F 3/12* (2006.01)
*G03G 15/00* (2006.01)

(52) U.S. Cl. ..................... 358/1.18; 358/1.12; 358/1.13; 399/382

(58) Field of Classification Search ........................ None
See application file for complete search history.

(56) References Cited

U.S. PATENT DOCUMENTS 5,398,289 A * 3/1995 Rourke et al. ................ 382/100
2002/0041780 A1* 4/2002 Sato et al. ..................... 399/382
2003/0007167 A1* 1/2003 Catt et al. ..................... 358/1.12

FOREIGN PATENT DOCUMENTS

JP 8-2697 1/1996
JP 2003-46761 2/2003
JP 2007-194997 8/2007
JP 2007-212832 8/2007

OTHER PUBLICATIONS

Japanese Office Action dated Aug. 26, 2009.
Japanese Office Action dated Apr. 22, 2010.

* cited by examiner

*Primary Examiner* — Vincent Rudolph
(74) *Attorney, Agent, or Firm* — Finnegan, Henderson, Farabow, Garrett & Dunner, L.L.P.

(57) ABSTRACT

An image forming apparatus having a function for binding a plurality of sheets, both sides of each of which have been printed, and outputting a booklet-shaped print, the image forming apparatus including: a shifting section which shifts drawing information to be printed on each page of at least one set of spread two pages of the booklet-shaped print so that the drawing information is separated from a bound position; and a synthesizing section which synthesizes drawing information near a bound side of one page of the two pages, information based on the drawing information, or predetermined background information, in a blank portion formed by a shift on a bound side of an other page of the two pages.

13 Claims, 13 Drawing Sheets

30: BOOKLET-SHAPED PRINT (PERSPECTIVE VIEW)

FIG. 3 (a) AFTER SHIFT PROCESS
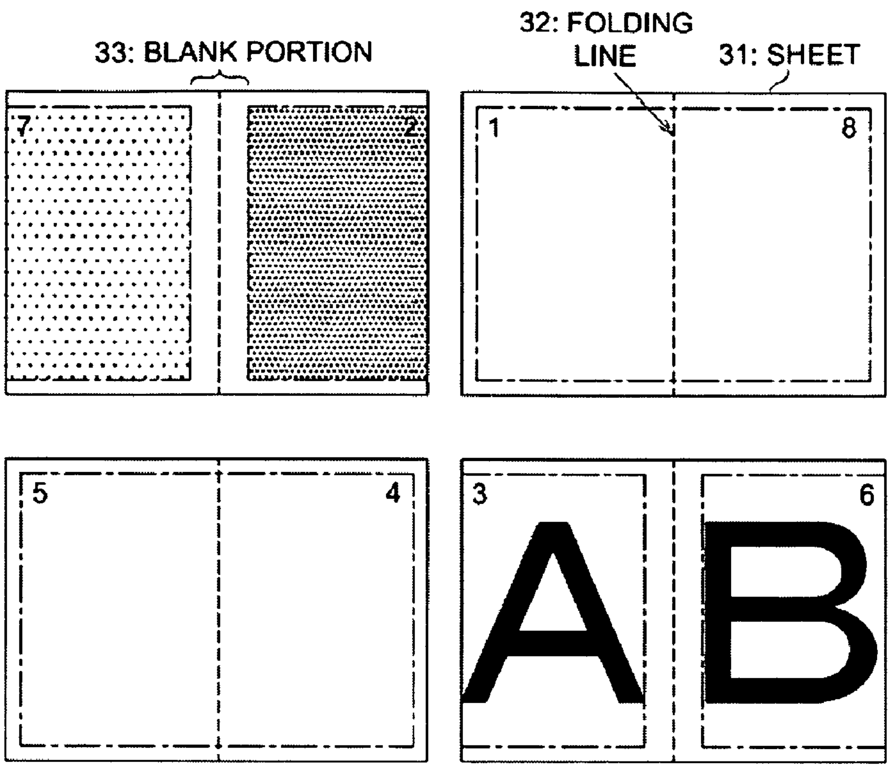
FIG. 3 (b) AFTER SYNTHESIS PROCESS
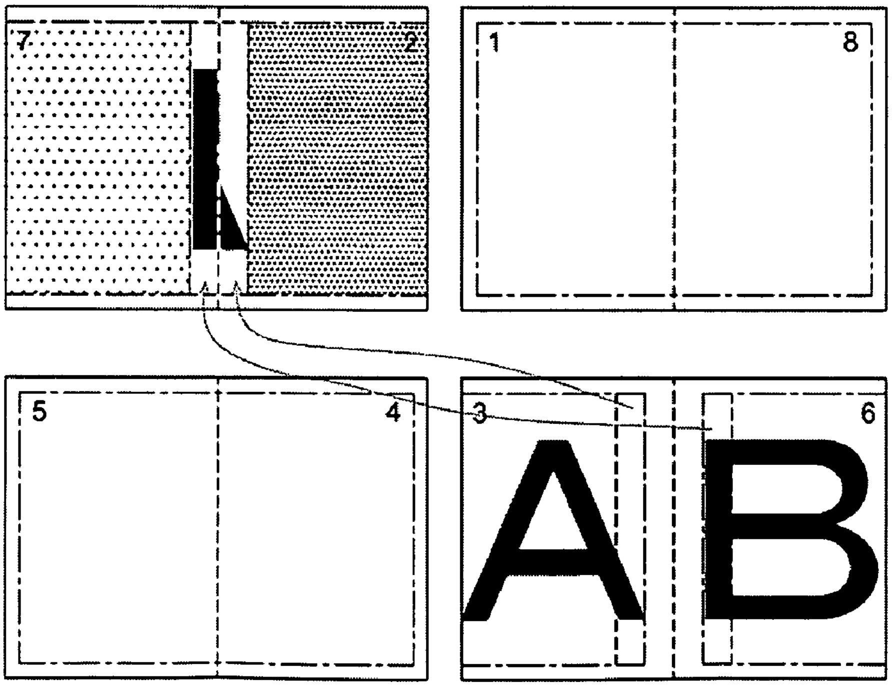

30: BOOKLET-SHAPED PRINT (PERSPECTIVE VIEW)

30: BOOKLET-SHAPED PRINT (FRONT VIEW)

30: BOOKLET-SHAPED PRINT (PERSPECTIVE VIEW)

30: BOOKLET-SHAPED PRINT (FRONT VIEW)

| BASIS WEIGHT | REFERENCE SHIFT AMOUNT (d) |
|---|---|
| 64-74 g/m$^2$ | 0.10 mm |
| 75-80 g/m$^2$ | 0.14 mm |
| 81-105 g/m$^2$ | 0.18 mm |
| 106-135 g/m$^2$ | 0.22 mm |
| 136-162 g/m$^2$ | 0.26 mm |
| 163-209 g/m$^2$ | 0.30 mm |
| 210-256 g/m$^2$ | 0.34 mm |
| 257-300 g/m$^2$ | 0.38 mm |

FIG. 9

| | |
|---|---|
| IN CASE OF 8 PAGES | SHIFT PAGE 2 BY THE REFERENCE SHIFT AMOUNT AND SYNTHESIZE THE DRAWING INFORMATION OF THE REFERENCE SHIFT AMOUNT OF PAGE 3,<br>SHIFT PAGE 7 BY THE REFERENCE SHIFT AMOUNT AND SYNTHESIZE THE DRAWING INFORMATION OF THE REFERENCE SHIFT AMOUNT OF PAGE 6, AND<br>SHIFT PAGES 3 AND 6 BY THE REFERENCE SHIFT AMOUNT. |
| IN CASE OF 12 PAGES | SHIFT PAGE 2 BY THE REFERENCE SHIFT AMOUNT X 2 AND SYNTHESIZE THE DRAWING INFORMATION OF THE REFERENCE SHIFT AMOUNT X 2 OF PAGE 3,<br>SHIFT PAGE 4 BY THE REFERENCE SHIFT AMOUNT AND SYNTHESIZE THE DRAWING INFORMATION OF THE REFERENCE SHIFT AMOUNT OF PAGE 5,<br>SHIFT PAGE 9 BY THE REFERENCE SHIFT AMOUNT AND SYNTHESIZE THE DRAWING INFORMATION OF THE REFERENCE SHIFT AMOUNT OF PAGE 8,<br>SHIFT PAGE 11 BY THE REFERENCE SHIFT AMOUNT X 2 AND SYNTHESIZE THE DRAWING INFORMATION OF THE REFERENCE SHIFT AMOUNT X 2 OF PAGE 10,<br>SHIFT PAGES 3 AND 10 BY THE REFERENCE SHIFT AMOUNT X 2, AND<br>SHIFT PAGES 5 AND 8 BY THE REFERENCE SHIFT AMOUNT. |
| IN CASE OF N PAGES | SHIFT PAGE 2n BY THE REFERENCE SHIFT AMOUNT X (N/4-n), AND SYNTHESIZE THE DRAWING INFORMATION OF THE REFERENCE SHIFT AMOUNT X (N/4-n) OF PAGE 2n+1,<br>SHIFT PAGE N-2n+1 BY THE REFERENCE SHIFT AMOUNT X (N/4-n), AND SYNTHESIZE THE DRAWING INFORMATION OF THE REFERENCE SHIFT AMOUNT X (N/4-n) OF PAGE N-2n, AND<br>SHIFT PAGES 2n +1 AND N-2n BY THE REFERENCE SHIFT AMOUNT X (N/4-n). |

FIG. 10 ( a ) AFTER SHIFT PROCESS
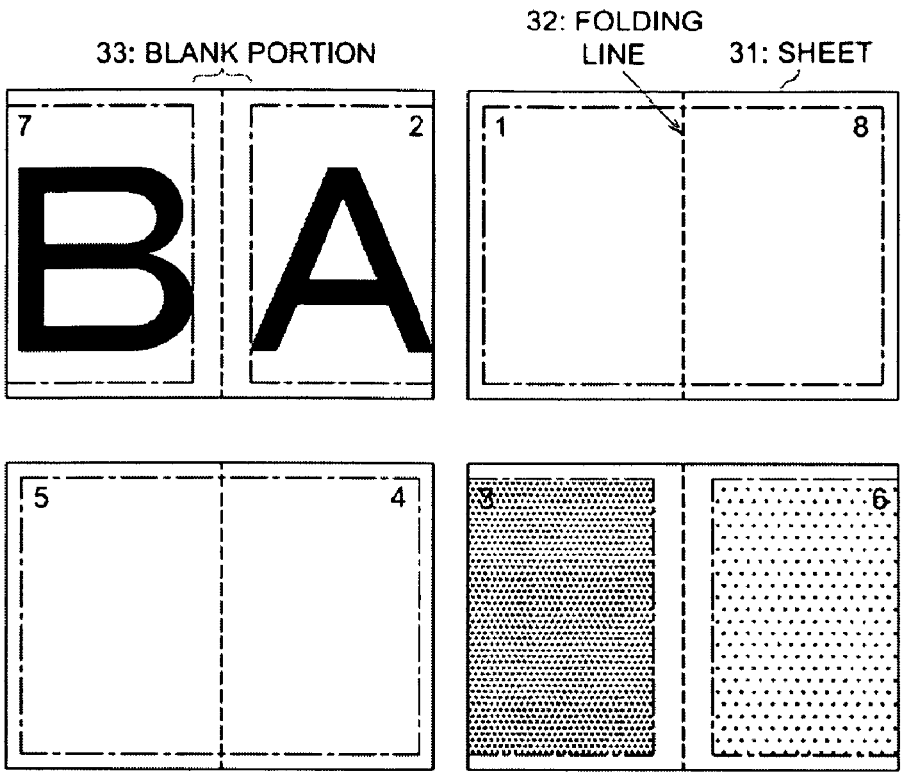
FIG. 10 ( b ) AFTER SYNTHESIS PROCESS
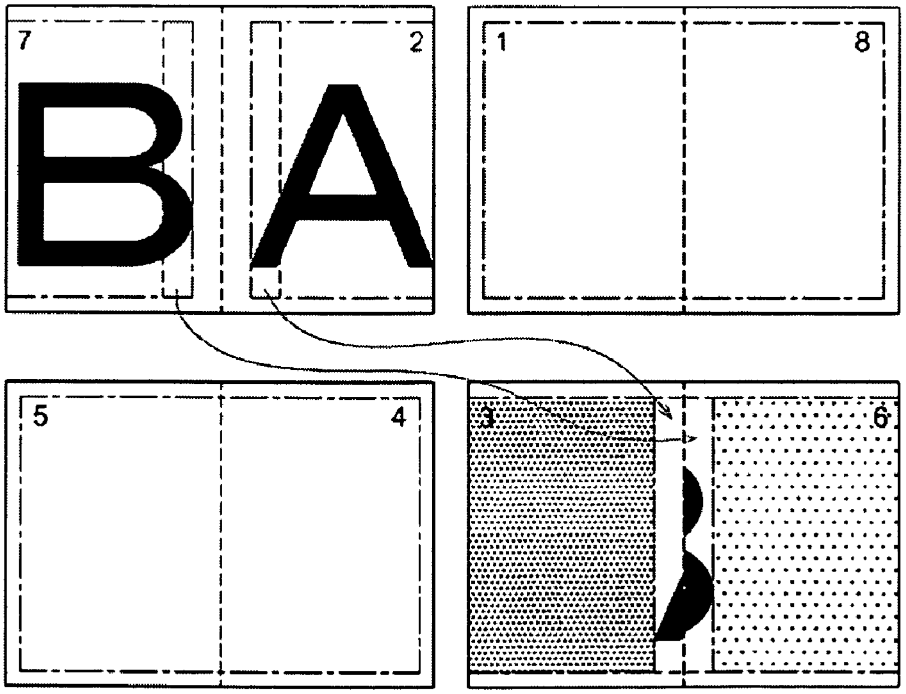

30: BOOKLET-SHAPED PRINT (PERSPECTIVE VIEW)

30: BOOKLET-SHAPED PRINT (FRONT VIEW)

30: BOOKLET-SHAPED PRINT (PERSPECTIVE VIEW)

30: BOOKLET-SHAPED PRINT (FRONT VIEW)

FIG. 13

| | |
|---|---|
| IN CASE OF 8 PAGES | SHIFT PAGE 3 BY THE REFERENCE SHIFT AMOUNT AND SYNTHESIZE THE DRAWING INFORMATION OF THE REFERENCE SHIFT AMOUNT OF PAGE 2,<br>SHIFT PAGE 6 BY THE REFERENCE SHIFT AMOUNT AND SYNTHESIZE THE DRAWING INFORMATION OF THE REFERENCE SHIFT AMOUNT OF PAGE 7,<br>SHIFT PAGES 2 AND 7 BY THE REFERENCE SHIFT AMOUNT. |
| IN CASE OF 12 PAGES | SHIFT PAGE 3 BY THE REFERENCE SHIFT AMOUNT X 2 AND SYNTHESIZE THE DRAWING INFORMATION OF THE REFERENCE SHIFT AMOUNT X 2 OF PAGE 2,<br>SHIFT PAGE 5 BY THE REFERENCE SHIFT AMOUNT AND SYNTHESIZE THE DRAWING INFORMATION OF THE REFERENCE SHIFT AMOUNT OF PAGE 4,<br>SHIFT PAGE 8 BY THE REFERENCE SHIFT AMOUNT AND SYNTHESIZE THE DRAWING INFORMATION OF THE REFERENCE SHIFT AMOUNT OF PAGE 9,<br>SHIFT PAGE 10 BY THE REFERENCE SHIFT AMOUNT X 2 AND SYNTHESIZE THE DRAWING INFORMATION OF THE REFERENCE SHIFT AMOUNT X 2 OF PAGE 11,<br>SHIFT PAGES 2 AND 11 BY THE REFERENCE SHIFT AMOUNT X 2, AND SHIFT PAGES 4 AND 9 BY THE REFERENCE SHIFT AMOUNT. |
| IN CASE OF N PAGES | SHIFT PAGE 2n+1 BY THE REFERENCE SHIFT AMOUNT X (N/4-n), AND SYNTHESIZE THE DRAWING INFORMATION OF THE REFERENCE SHIFT AMOUNT X (N/4-n) OF PAGE 2n,<br>SHIFT PAGE N-2n+1 BY THE REFERENCE SHIFT AMOUNT X (N/4-n), AND SYNTHESIZE THE DRAWING INFORMATION OF THE REFERENCE SHIFT AMOUNT X (N/4-n) OF PAGE N-2n+1, AND<br>SHIFT PAGES 2n AND N-2n+1 BY THE REFERENCE SHIFT AMOUNT X (N/4-n). |

FIG. 14

50: BOOKLET-SHAPED PRINT (PERSPECTIVE VIEW)

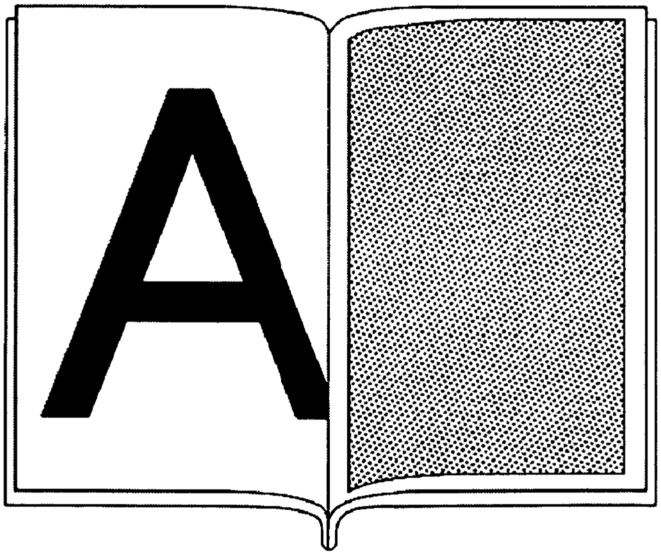

IMAGE FORMING APPARATUS, IMPOSITION METHOD FOR BOOKLET-SHAPED PRINTS, AND BOOKLET-SHAPED PRINTS

RELATED APPLICATION

This application is based on Japanese Patent Application No. 2007-298930 filed on Nov. 19, 2007 in Japan Patent Office, the entire content of which is hereby incorporated by reference.

TECHNICAL FIELD

The present invention relates to an image forming apparatus which makes booklet-shaped prints, an imposition method for the booklet-shaped prints, and the booklet-shaped prints.

BACKGROUND

Copying machines and multi-function peripherals having copy function, facsimile function, and scanner function (hereinafter, these are defined as an image forming apparatus) are widespread. The image forming apparatus, using a finishing function, can make prints such as weekly magazines, catalogues, and books (hereinafter, these are defined as booklet-shaped prints).

Book-like prints are bound so as to prevent sheets from separation, so that the bound portion in the neighborhood of the center of the two spread pages is not seen, thus the images printed on the overall two spread pages are interrupted and misshaped between the pages, and if there is a sentence at the center of the two spread pages, a problem arises that illegible letters occur, and the problem stands out, as the number of pages of book-like prints increases.

For the aforementioned problem, there is an art of shifting outwards drawing information such as letters and images from the bound portion on each of the two spread pages. For example, in Unexamined Japanese Patent Application Publication No. H07-287428, in an image forming apparatus for reading and recording on the recording sheets sequentially image data of each page of document image data composed of several pages so that the recording sheets are arranged in the order of pages when folding the recording sheets, a configuration is disclosed that a means for moving symmetrically the image recording position on each recording sheet at a predetermined distance around the folding line, a means for inputting information in accordance with the thickness of the recording sheets, and a means for changing sequentially the predetermined distance whenever recording an image on each recording sheet are installed.

Further, in Unexamined Japanese Patent Application Publication No. 2004-66582, in an image forming apparatus having an image forming means for forming images in consideration of the finishing process of sheet members, a configuration is disclosed that a sheet count detection means for detecting the number of sheets of the sheet members to be finished, a binding margin adjustment means for adjusting the binding margin at the time of image formation by the image forming means, and a mode selection means for selecting a mode selectively from a plurality of finishing modes are installed, and the image forming means, according to the number of sheets detected by the sheet count detection means and the finishing mode selected by the mode selection means, adjusts the binding margin by the binding margin adjustment means, thereby forms images.

By the methods described in Unexamined Japanese Patent Application Publication No. 7-287428 and Unexamined Japanese Patent Application Publication No. 2004-66582 which are mentioned above, as shown in FIG. 14, the visibility and appearance of the drawing information can be improved in case when both ends of the two spread pages are pulled outside and the pages can be spread largely.

However, in a case when careful handling is required like a borrowed magazine or book or if a binding margin is large and the pages can be hardly spread, as shown in FIG. 15(*a*), the pages on the side where there are more sheets of booklet-shaped prints 50 (the left pages in the drawing) are curved at a large radius of curvature (that is, curved slowly) or as shown in FIG. 15(*b*), the pages on the side where there are less sheets (the right pages in the drawing) are curved at a large radius of curvature, thus the images and letters in the neighborhood of the bound portion cannot be seen, and a problem arises that the visibility of the pages on the curved side is deteriorated.

Further, in a method for shifting outward from the bound portion, images and letters which are printed on each page, a blank portion 51 where nothing is printed is formed in the neighborhood of the bound portion, so that the blank portion 51 of each page on the side being not curved is conspicuous and a problem arises that the appearance does not look good.

The present invention was developed with the foregoing problems in view and its main object is to provide an image forming apparatus capable of improving the visibility and appearance when either of the two spread pages is curved at a large radius of curvature, an imposition method for booklet-shaped prints, and booklet-shaped prints.

SUMMARY

To achieve at least one of the above mentioned objects, an image forming apparatus reflecting one aspect of the present invention has a function for binding a plurality of sheets, both sides of each of which have been printed, and outputting a booklet shaped print, the image forming apparatus comprising: a shifting section which shifts drawing information to be printed on each page of at least one set of spread two pages of the booklet-shaped print so that the drawing information is separated from a bound position; and a synthesizing section which synthesizes drawing information near a bound side of one page of the two pages, information based on the drawing information, or predetermined background information, in a blank portion formed by a shift on a bound side of an other page of the two pages.

In the above mentioned image forming apparatus, it is preferable that, when the one set of the two pages is spread, more numbers of pages exist at a side of the one page than the side of the other page In the above mentioned image forming apparatus, it is also preferable that, when the one set of the two pages is spread, less numbers of pages exist at a side of the one page than the side of the other page.

BRIEF DESCRIPTION OF THE DRAWINGS

FIGS. 3(*a*) and 3(*b*) are drawings showing schematically the shift process and synthesis process relating to the first embodiment of the present invention.

FIG. 9 is a drawing showing the rules of the shift process and synthesis process relating to the first embodiment of the present invention.

FIGS. 10(*a*) and 10(*b*) are drawings showing the page layout of the booklet-shaped prints relating to the second embodiment of the present invention.

FIG. 13 is a drawing showing the rules of the shift process and synthesis process relating to the second embodiment of the present invention.

FIG. 14 is a perspective view showing the external configuration (when the radius of curvature of the curve is small) of conventional booklet-shaped prints.

DESCRIPTION OF THE PREFERRED EMBODIMENTS

Figure 1:
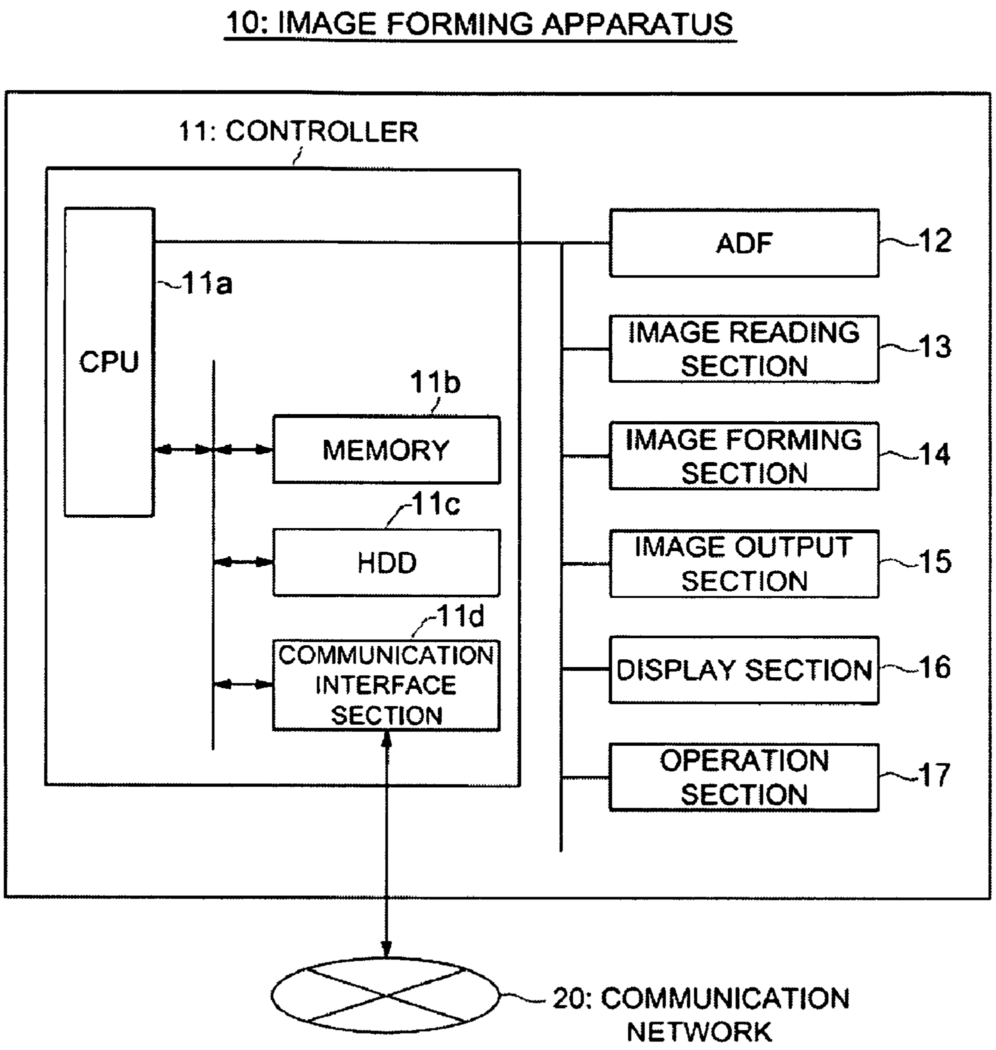
FIGS. 1(*a*) and 1(*b*) are block diagrams showing the configuration of the image forming apparatus relating to the first embodiment of the present invention.
Figure 1:
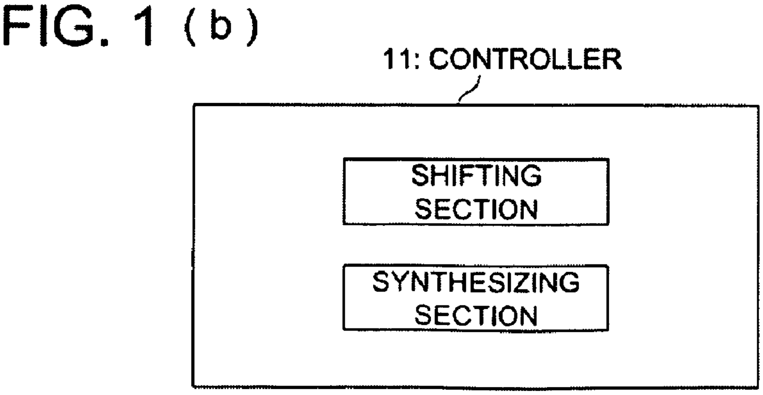

As described in the background, in booklet-shaped prints, the drawing information in the neighborhood of the bound portion is hardly seen, so that the method for shifting outward from the bound portion the drawing information printed in each of the spread pages is used. However, in this method, if either of the pages is curved at a large radius of curvature, a problem arises that the visibility of the curved page is deteriorated and the appearance of the blank portion of the non-curved page is conspicuous and does not look good.

Therefore, in this embodiment, in the image forming apparatus, the shifting section and synthesizing section are installed as hardware or software, and the shifting section shifts the drawing information outward on each of the two spread pages, and the synthesis section synthesizes the drawing information near the bound side of either of the pages and background information in the blank portion formed by the shift of the opposite page, thus the visibility and appearance are improved. Hereinafter, it will be explained concretely with reference to the accompanying drawings.

Embodiment 1

Figure 4:
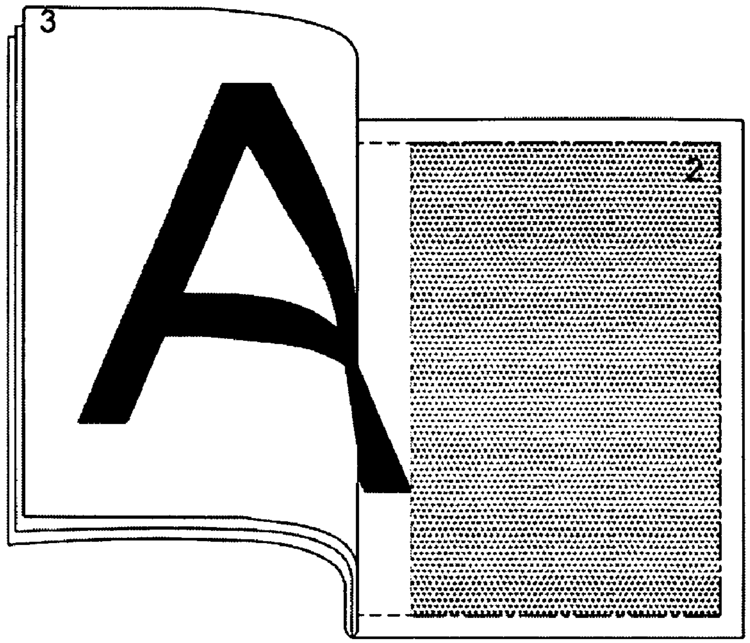
FIGS. 4(*a*) and 4(*b*) are a perspective view and a front view showing the external configuration of the booklet-shaped prints relating to the first embodiment of the present invention.
Figure 4:
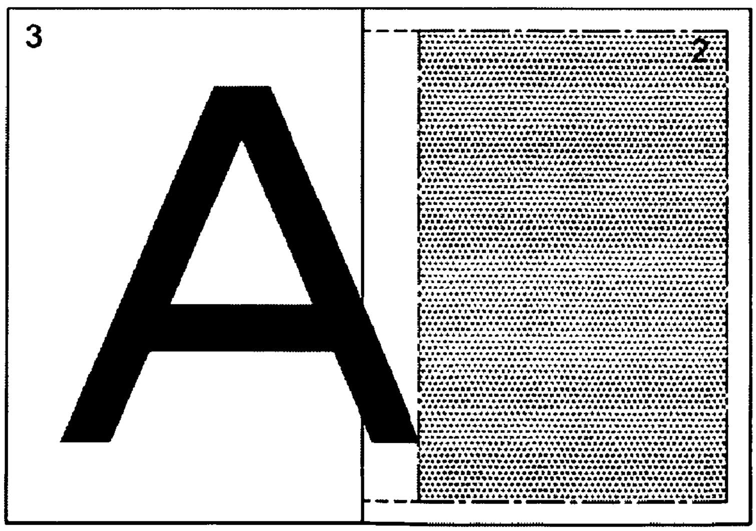
Figure 5:
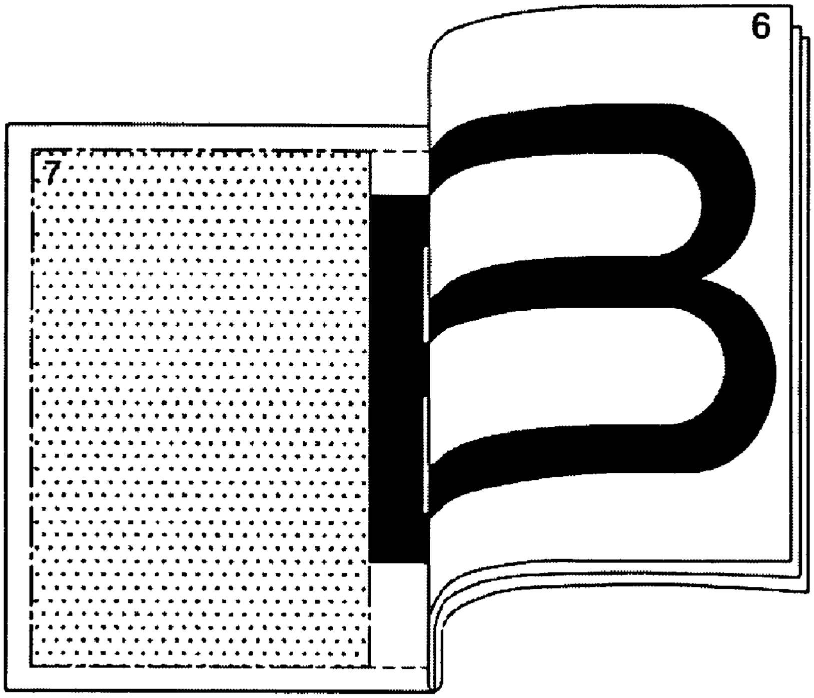
FIGS. 5(*a*) and 5(*b*) are a perspective view and a front view showing the external configuration of the booklet-shaped prints relating to the first embodiment of the present invention.
Figure 5:
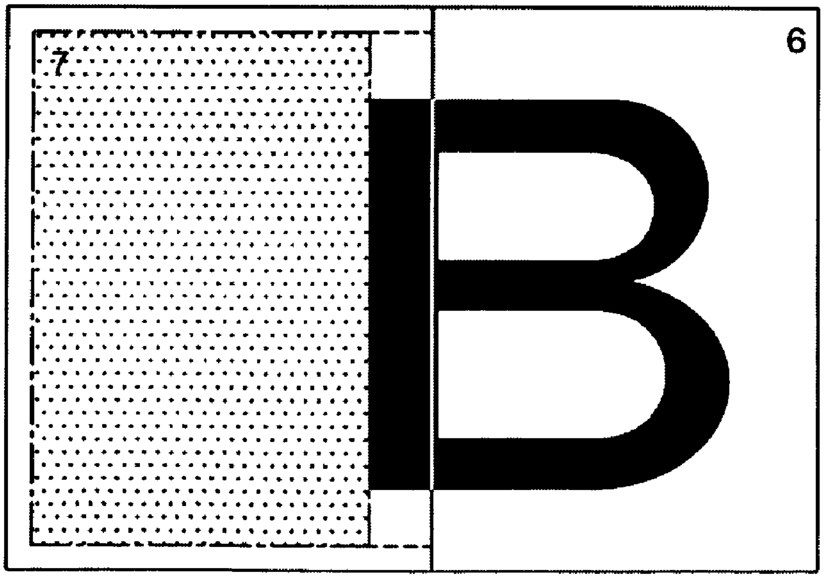
Figure 6:
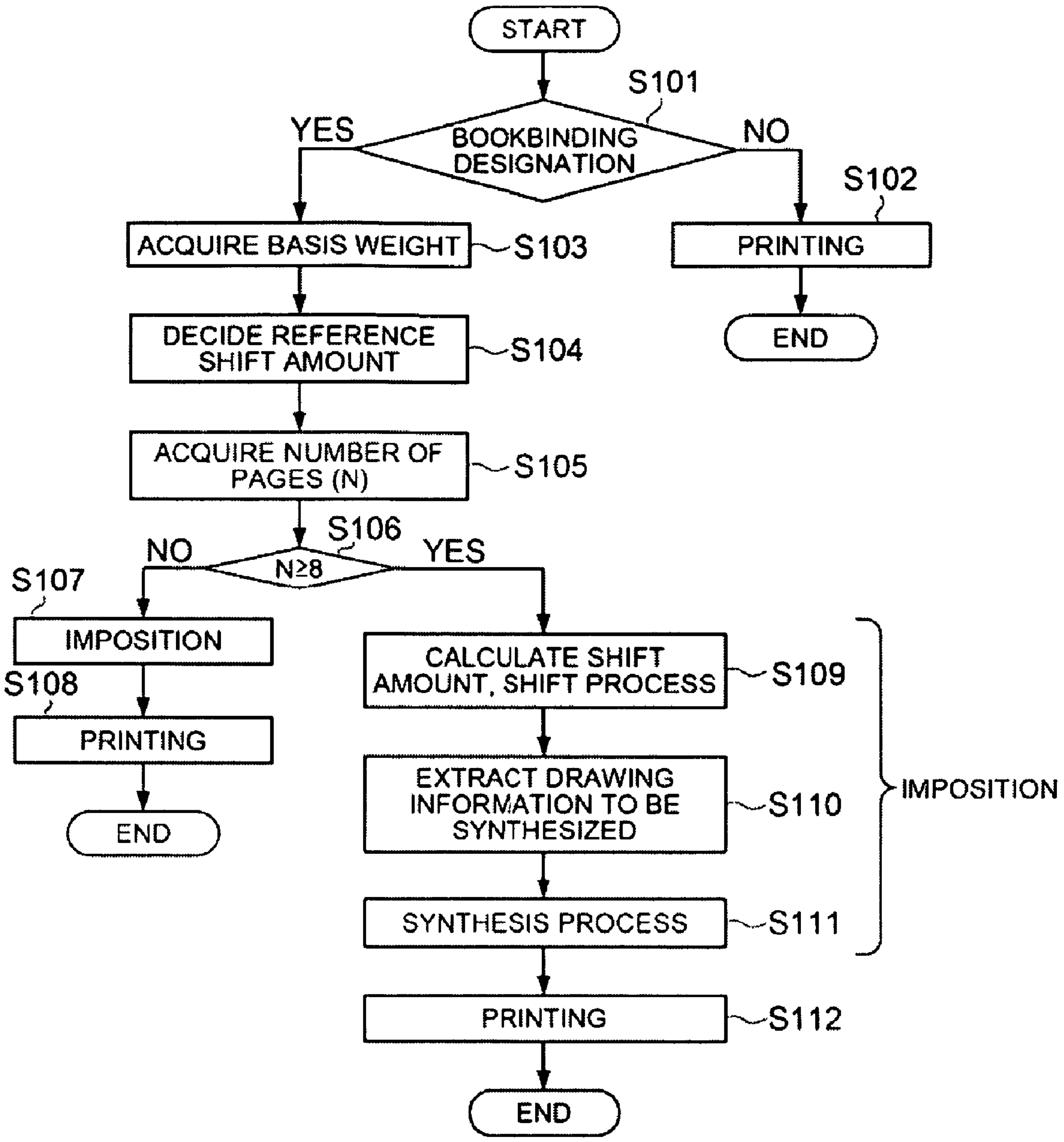
FIG. 6 is a flow chart showing the preparation procedure of the booklet-shaped prints relating to the first embodiment of the present invention.
Figures 7, 8:
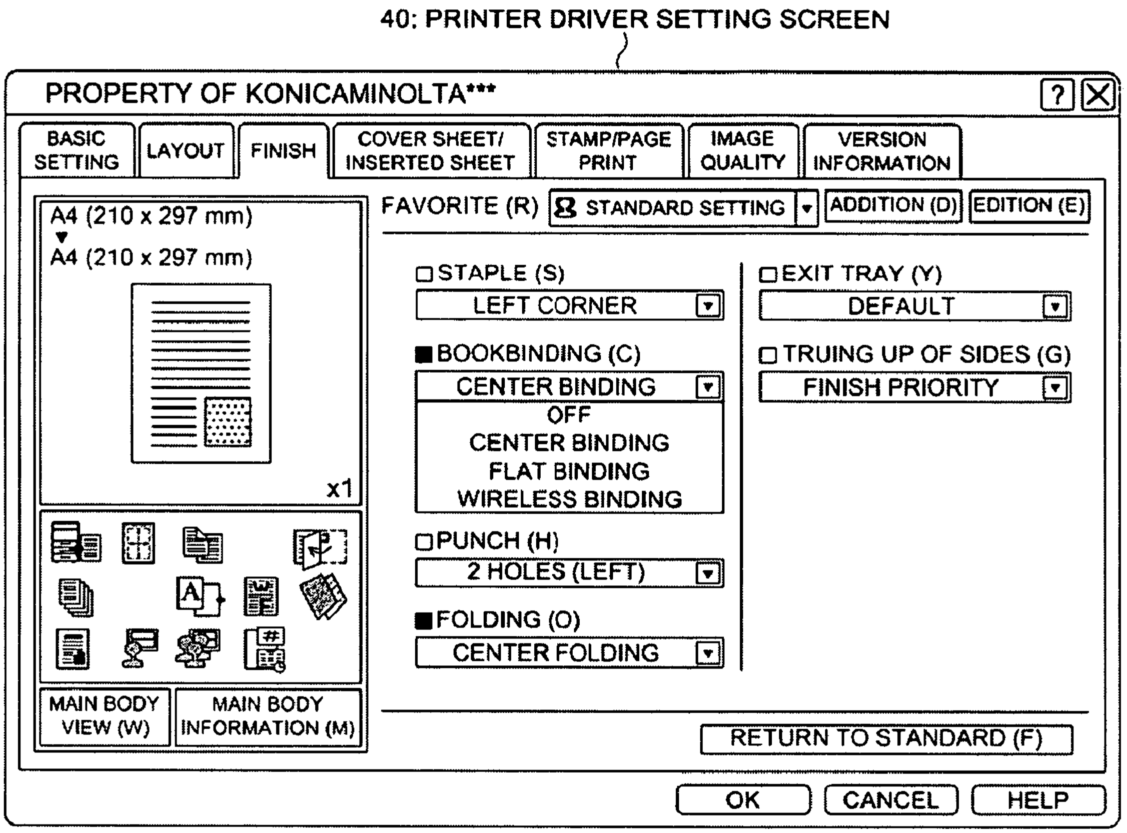
FIG. 7 is a drawing showing a configuration example of the printer driver setting screen.
FIG. 8 is a table of specifying the relationship between the basis weight and the reference shift amount.

Firstly, the image forming apparatus, an imposition method for booklet-shaped prints, and booklet-shaped prints relating to the first embodiment of the present invention will be explained by referring to FIGS. 1 to 9. FIGS. 1 (*a*) and 1(*b*) are block diagrams showing the configuration of the image forming apparatus of this embodiment, and FIGS. 2(*a*), 2(*b*) and 2(*c*) are drawings showing the page layout of the booklet-shaped prints relating to this embodiment, and FIGS. 3(*a*) and 3(*b*) are drawings showing schematically the shift process and synthesis process. FIGS. 4 and 5 are drawings showing external configuration examples of the booklet-shaped prints of this embodiment and FIG. 6 is a flow chart showing the preparation procedure of the booklet-shaped prints of this embodiment. Further, FIG. 7 is a drawing showing a configuration example of the printer driver setting screen, and FIG. 8 is an example of the table of specifying the relationship between the basis weight and the reference shift amount, and FIG. 9 is a drawing showing the rules of the shift process and synthesis process.

As shown in FIG. 1(*a*), an image forming apparatus 10 includes a controller 11, an ADF (auto document feeder) 12, an image reading section 13, an image forming section 14, an image output section 15, a display section 16, and an operation section 17.

The controller 11 is a section for controlling each component, which includes a CPU (central processing unit) 11*a*, a memory 11*b* such as a ROM (read only memory) and a RAM (random access memory), an HDD (hard disk drive) 11*c*, and a communication interface section 11*d*, and these sections are connected via a bus. The CPU 11*a* controls each section and performs an image process. The memory 11*b* is a section for storing temporarily print data received from the communication interface section 11*d* or image data received from the image reading section 13, and the stored data is image-processed by the CPU 11*a* and when necessary, is transferred to the HDD 11*c* or image output section 16. The HDD 11*c* stores the program of the CPU 11*a* for controlling each section and the information regarding the processing function of the apparatus, which are read by the CPU 11*a* when necessary and are executed on the memory 11*b*. The communication interface section 11*d* establishes connections with a server, a client, and other devices connected via a communication network 20 and transmits and receives data.

The ADF 12 is a section for conveying a single or a plurality of document sheets to the image reading section 13.

The image reading section 13 is a section for reading an image of each document sheet on the document table, which is composed of a light source for scanning the document sheet, a CCD (charge coupled devices) image sensor for converting light reflected from each document sheet to a electric signal, and an A-D converter for converting the electric signal from analog to digital.

The image forming section 14 includes components necessary for image formation using the electrophotographic or electrostatic recording imaging process, for example, a photo conductor, a transfer belt, a fixing device, and various conveying belts and by an instruction from the controller 11, on the basis of the print data received from the communication interface section 11*d* or the image data received from the image reading section 13, forms an image on a print medium.

The image output section 15 outputs the print medium conveyed from the image forming section 14 after additionally performing the finishing process desired by a user (for example, bending, bookbinding, stapling, etc.).

The display section 16 is composed of a liquid crystal display (LCD) and an electroluminescence display and displays various screens for operating the image forming apparatus 10. Further, the operation section 17 is composed of a button and a switch and designates various settings and issues instructions. Further, the display section 16 and operation section 17 may be installed separately or a pressure-sensitive operation section (touch panel) 17 composed of transparent electrodes arranged in the lattice shape may be integrally on the display section 16 and the touch panel detects the XY coordinates of the stress point pressed by a finger or a touch pen by a voltage and outputs the detected position signal to the controller 11 as an operation signal.

Further, the controller 11, when performing a process for assigning letters, figures, and images (hereinafter, these are defined as drawing information) of each page of print data so as to be arranged in the correct order at the time of bookbinding (the so-called imposition process), as shown in FIG. 1(*b*), functions as a shifting section for shifting the drawing information printed on each page of the spread pages outside by the value calculated according to the predetermined rules and as a synthesizing section for synthesizing the drawing information near the bound side of one page in the blank portion produced by the shift of the opposite page. The shifting section and synthesizing section may be configured as hardware or a computer is configured as a control program for functioning it as a shifting section and a synthesizing section and the concerned control program may be operated on the controller 11.

Figure 2:
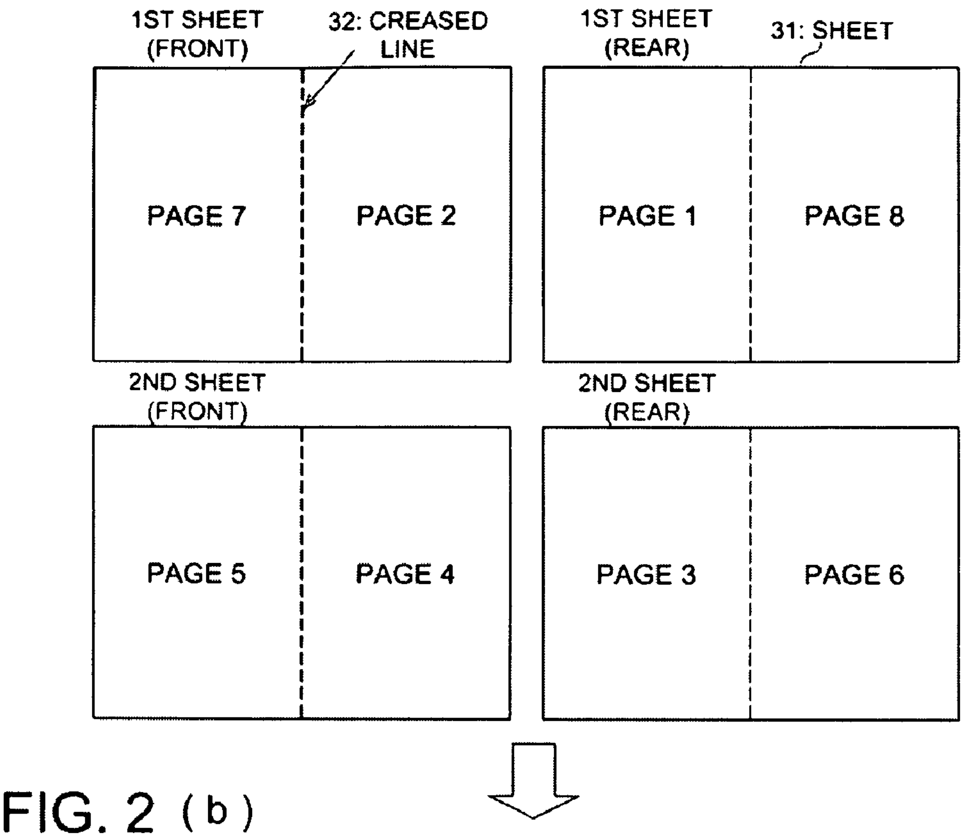
FIGS. 2(*a*), 2(*b*) and 2(*c*) are drawings showing the page layout of the booklet-shaped prints relating to the first embodiment of the present invention.
Figure 2:
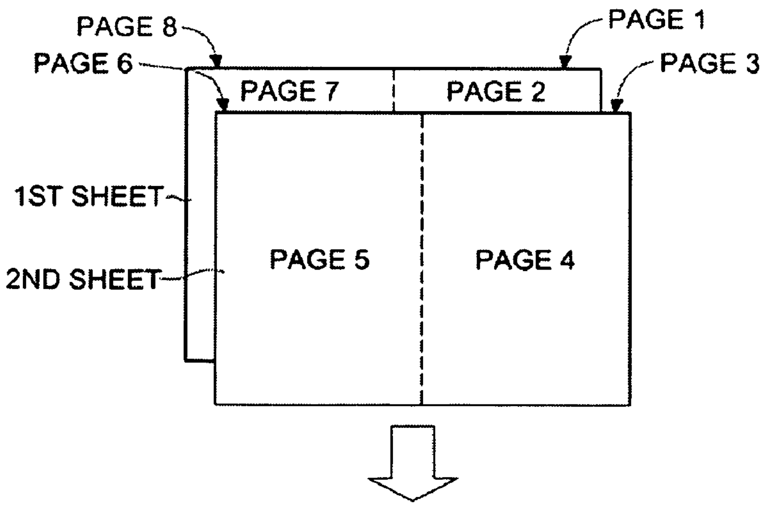
Figure 2:
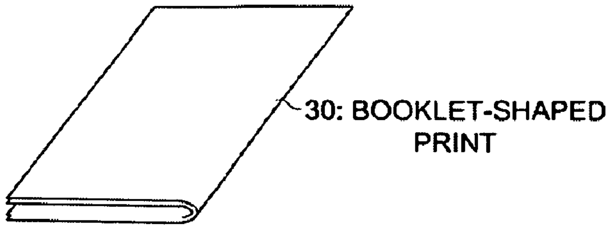

An example of booklet-shaped prints prepared by the image forming apparatus 10 having the aforementioned configuration will be explained. As shown in FIG. 2(*a*), in booklet-shaped prints 30 of this embodiment, drawing information is printed on each page partitioned by the central line (hereinafter, called a folding line 32) of both sides of each of print media (hereinafter, called sheets 31) of a plurality of sheets of paper (in this embodiment, for simplicity of explanation, two sheets are defined) or plastic films and as shown in FIG. 2(*b*), a plurality of sheets 31 are overlaid, and as shown in FIG. 2(*c*), the sheets are folded at the folding line 32 and are bound.

Here, the cover sheet (in this case, page 1) and back cover sheet (in this case, page 8) are not inhibited in the visibility of drawing information by the other pages and the central pages (in this case, pages 4 and 5) are configured so as to be easily opened around the folding line 32, so that the visibility of the drawing information is satisfactory, though the other pages may be inhibited in the visibility. For example, when holding the booklet-shaped prints 3 in one hand and reading the prints by turning the pages one by one by the other hand, the entire sheets 31 on the side where there are more remaining pages are curved at a large radius of curvature, so that the drawing information in the neighborhood of the folding line 32 of each curved page is hard to see.

Therefore, in this embodiment, firstly, as shown in FIG. 3(*a*), using the shifting section, a process (hereinafter, called a shift process) of shifting outside the drawing information of each page (in this case, pages 2, 3, 6, and 7) of the two spread pages other than central pages of the booklet-shaped print so as to separate from the folding line 32 and forming a blank portion 33 in the neighborhood of the folding line 32 is performed.

By this shift process, the visibility of the drawing information in the neighborhood of the folding line 32 can be improved, though when the number of the sheets 31 of the booklet-shaped prints 30 is increased, the degree of curvature (radius of curvature) of the sheets 31 on one side (in this embodiment, the side where there are more remaining sheets) is increased and the drawing information in the neighborhood of the folding line 32 becomes hard to see. For this problem, a method for increasing more the shift amount may be considered, though in this method, the blank portion 33 in the neighborhood of the folding line 32 on the other side (in this embodiment, the side where there are less remaining sheets) is conspicuous, thus the appearance is deteriorated remarkably.

Therefore, in this embodiment, furthermore, as shown in FIG. 3(*b*), using the synthesizing section, a process (hereinafter, called the synthesis process) of extracting the drawing information (in the drawing, the information at the right end of the letter "A" on page 3 or the information at the left end of the letter "B" on page 6) in the neighborhood of the side of the folding line 32 of the pages (in this case, pages 3 and 6) which are curved at a large radius of curvature and are deteriorated in the visibility and synthesizing the extracted information in the blank portions 33 of the pages (in this case, pages 2 and 7) on the opposite side of the concerned pages is performed. Namely, a process of synthesizing a part of the drawing information of the opposite page of a predetermined page in the blank portion 33 thereof.

By performing the two processes, as shown in FIG. 4(*a*), the neighborhood of the folding line 32 of the third page is curved at a large radius of curvature and a part of the drawing information (in this case, the right end of the letter "A") cannot be seen, though the part of the drawing information can be confirmed on page 2 on the opposite side, so that the visibility can be improved particularly. Further, in the blank portion 33 of page 2, the drawing information on page 3 is synthesized, so that the appearance can be improved remarkably. Further, when viewing obliquely the booklet-shaped prints 30, as shown in FIG. 4(*a*), the drawing information of page 3 and the drawing information of page 2 are seen so as to be shifted to some degree, though when viewing the booklet-shaped prints 30 from front, as shown in FIG. 4(*b*), the shift can be canceled.

Similarly, as shown in FIG. 5(*a*), the neighborhood of the folding line 32 of the sixth page is curved at a large radius of curvature and a part of the drawing information (in this case, the left end of the letter "B") cannot be seen, though the part of the drawing information can be confirmed on page 7 on the opposite side, so that the visibility can be improved particularly. Further, in the blank portion 33 of page 7, the drawing information on page 3 is synthesized, so that the appearance can be improved particularly. Further, when viewing the booklet-shaped prints 30 from front, the shift can be canceled.

The case that the sheets 31 are folded and are bound in a book is shown in FIGS. 2 to 5. Further, this process can be applied to the case that sheets are stacked up without folding and are bound at one end.

Next, the concrete procedure of making the booklet-shaped prints 30 will be explained by referring to the flow chart shown in FIG. 6.

Firstly, using a computer terminal of a client, print data, PDF (portable document format) data, and data described in a page description language (PDL) such as PS (post script) or PCL (printer control language) are prepared. In this case, when making the booklet-shaped prints 30 by the image forming apparatus 10, on a printer driver setting screen 40 as shown in FIG. 7, the tab of Finishing is selected and the bookbinding method is designated. For example, when making the booklet-shaped prints 30 in the form shown in FIG. 2, in the field of Folding, Folding (a method for folding in two at the center) is selected and in the field of Bookbinding, Center Binding (a method for binding the spine center with a wire together with the cover sheet) is selected.

Further, as a folding method, even if Single Double-Leaf Folding or Double Double-Leaf Folding is selected, the visibility in the neighborhood of the folding line is deteriorated, though in this embodiment, for simplicity of explanation, folding is selected. Further, as a bookbinding method, even if Flat Binding (a method for binding the ends of sheets with a wire in the stacking direction and wrapping them with a spine cover sheet) or Wireless Binding (a method for coating an adhesive on the spine and pasting a spine cover sheet thereon) is selected, the visibility in the neighborhood of the folding line is deteriorated, though in this embodiment, for simplicity of explanation, Center Binding is selected.

And, the prepared print data is transmitted to the image forming apparatus 10 and the image forming apparatus 10 receives the print data using the communication interface section 11*d*. Further, as print data, in addition to print data received from a client, print data stored beforehand in the HDD 11*c* of the image forming apparatus 10 may be used or image data read from a document by the image reading section 13 may be used.

Next, at Step S101, the controller 11 analyzes the print data, judges whether there is a designation for bookbinding or not (when using the image data read from the document by the image reading section 13, judges whether bookbinding is designated by the operation section 17 or not), and if there is no designation for bookbinding, transmits the print data to the image forming section 14, and at Step S102, the image forming section 14 executes printing on the basis of the print data, and the processing is finished.

On the other hand, if there is a designation for bookbinding, the image forming section 14 executes the subsequent shift process and synthesis process, though, in the booklet-shaped prints, the difficulty to open varies with the thickness and material (that is, the basis weight of specifying the weight per unit area) of ths sheets, so that at Step S103, the controller 11 acquires the basis weight corresponding to the sheets selected by the print data, and at Step S104, refers to the table stored beforehand in the memory 11*b* or HDD 11*c*, and decides the reference value (hereinafter, called the reference shift amount) for deciding how much to change the shift amount of the drawing information per each page. FIG. 8 shows an example of the table of making the basis weight and reference shift amount correspond to each other and for example, when using sheets of 81 to 105 g/m$^2$, whenever one sheet is increased, the shift amount of the drawing information is increased by 0.18 mm. Further, the table can be prepared by making beforehand booklet-shaped prints 30 using sheets of each basis weight and confirming how much to shift the drawing information of each page to improve the visibility.

Further, in the booklet-shaped prints, the difficulty to open varies with the number of sheets (that is, the number of pages), so that at Step S105, the controller 11 analyzes the print data and acquires the number of pages, and at Step S106, judges whether the number of pages is a predetermined value or more. The predetermined value is not limited particularly, though if the number of pages is less than 8 (the front cover sheet and back cover sheet are assumed respectively as one page and when printing both sides, 4 pages in total), even if the shift process and synthesis process are not executed, it may be considered that the problem of visibility will not result, so that in this embodiment, 8 pages are assumed as a standard.

And, when the number of pages is less than 8, at Step S107, the controller 11 performs the imposition process and transmits the print data after the imposition process to the image forming section 13, and at Step S108, the image forming section 13 executes printing based on the print data after the imposition process, and the image output section 15 performs a predetermined finishing process, and the processing is finished.

On the other hand, when the number of pages is 8 or more, at Step S109, the shifting section calculates the shift amount for each page according to the predetermined rule and shifts outside the drawing information of each page so as to be separated from the folding line. FIG. 9 shows an example of the rule for deciding the shift amount of each page hinged.

For example, in the explanation on the assumption of the page configuration shown in FIG. 2 under the condition that the basis weight of sheets used is 81 to 105 g/m$^2$ and the reference shift amount d is 0.18 mm as shown in FIG. 8, when the number of pages is 8, the drawing information on pages 2 and 6 is shifted respectively by 0.18 mm in the right direction and the drawing information on pages 3 and 7 is shifted respectively by 0.18 mm in the left direction. Further, when the number of pages is 12, the drawing information on pages 2 and 10 is shifted respectively by 2×0.18=0.36 mm in the right direction and the drawing information on pages 4 and 8 is shifted respectively by 0.18 mm in the right direction. Further, the drawing information on pages 3 and 11 is shifted respectively by 0.36 mm in the left direction and the drawing information on pages 5 and 9 is shifted respectively by 0.18 mm in the left direction.

When it is generalized, if the number of pages is N (N is a multiple of 4 such as 8 or more), the drawing information on pages 2n and N−2n (n is an integer of 1 or more and less than N/4) is shifted respectively by d×(N/4−n) in the right direction and the drawing information on pages 2n+1 and N−2n+1 is shifted respectively by d×(N/4−n) in the left direction.

Next, at Step S110, the synthesizing section extracts the drawing information to be synthesized on a predetermined page from the opposite page.

For example, when explaining the case that, similarly, sheets of a basis weight of 81 to 105 g/m$^2$ are used and the reference shift amount d is 0.18 mm, if the number of pages is 8, as drawing information to be synthesized on page 2, the drawing information at a distance of 0.18 mm from the right end of page 3 is extracted and as drawing information to be synthesized on page 7, the drawing information at a distance of 0.18 mm from the left end of page 6 is extracted. Further, when the number of pages is 12, as drawing information to be synthesized on page 2, the drawing information at a distance of 2×0.18=0.36 mm from the right end of page 3 is extracted and as drawing information to be synthesized on page 4, the drawing information at a distance of 0.18 mm from the right end of page 5 is extracted. Further, as drawing information to be synthesized on page 11, the drawing information at a distance of 0.36 mm from the left end of page 10 is extracted and as drawing information to be synthesized on page 9, the drawing information at a distance of 0.18 mm from the left end of page 8 is extracted.

When it is generalized similarly, as drawing information to be synthesized on page 2n, the drawing information at a distance of d×(N/4-n) from the right end of page 2n+1 is extracted and as drawing information to be synthesized on page N−2n+1, the drawing information at a distance of d×(N/4−n) from the left end of page N−2n is extracted.

And, at Step S111, the synthesizing section synthesizes the extracted drawing information in the blank portion of the opposite page.

For example, when the number of pages is 8, the drawing information on the right side of page 3 is synthesized in the blank portion on the left side of page 2 and the drawing information on the left side of page 6 is synthesized in the blank portion on the right side of page 7. Further, when the number of pages is 12, the drawing information on the right side of page 3 is synthesized in the blank portion on the left side of page 2 and the drawing information on the right side of page 5 is synthesized in the blank portion on the left side of page 4. Further, the drawing information on the left side of page 10 is synthesized in the blank portion on the right side of page 11 and the drawing information on the left side of page 8 is synthesized in the blank portion on the right side of page 9.

When it is generalized similarly, the drawing information on the right side of page 2n+1 is synthesized in the blank portion on the left side of page 2n and the drawing information on the left side of page N−2n is synthesized in the blank portion on the right side of page N−2n+1.

Further, the shift process and synthesis process are described above on the assumption of the page configuration shown in FIG. 2 and when counting the number of pages in the opposite direction, it is desirable to consider by reversing the left and right. Further, when not counting the front cover sheet and back cover sheet respectively as one page, it is desirable to assume the value obtained by subtracting one from each page number as a page number.

Thereafter, the controller 11 transmits the print data after the shift process and synthesis process aforementioned to the image forming section 14, and at Step S112, the image forming section 14 executes printing on the basis of the print data after the processing, and the image output section 15 performs the predetermined finishing process (in this case, folding and center binding), thus the processing is finished.

As mentioned above, in this embodiment, when bookbinding printing at a number of pages which is a predetermined value or more is instructed, the shifting section, according to a predetermined rule, shifts the drawing information of each page of the two spread pages outside so as to be separated from the folding line and the synthesizing section performs a process of synthesizing the drawing information in the neighborhood of the folding line side where there are more remaining pages when the pages are spread, in the blank portion in the neighborhood of the folding line of the opposite page, even if the sheets are curved at a large radius of curvature as shown in FIGS. 4 and 5, therefore the visibility of the drawing information on the curved page can be improved drastically through filling out the blank portion, thus the appearance can be improved drastically.

Further, in the above explanation, the case that the shift process and synthesis process are executed for all the spread pages excluding the center thereof is indicated, however, for the spread pages having no drawing information in the neighborhood of the folding line 32, there is no need to execute the shift process and synthesis process.

Further, in the above explanation, the case that in the blank portion 33 of a predetermined page, a part of the drawing information of the opposite page of the spread page is synthesized straight is indicated, though when reading the booklet-shaped prints 30 put on a desk, the glance is inclined against the normal line of the booklet-shaped prints 30, so as to see continuously the drawing information when the glance is inclined, it is possible to shift and synthesize the concerned part of the drawing information along the folding line (for example, shift upward). Further, regarding the page the drawing information of which is synthesized, the distance from the eyes is longer than that of the page on the curved side on the opposite side and the drawing information is seen small, so that the part of the drawing information may be enlarged and synthesized at a predetermined ratio. Further, when emphasis is put on recognition of the drawing information of the part which cannot be seen due to curvature, a part of the concerned drawing information may be synthesized repeatedly.

Further, in the above explanation, the case that in the blank portion 33 of the predetermined page, the drawing information of the opposite page is synthesized is indicated, however, when emphasis is put on improvement of the unattractive appearance due to that the blank portion 33 is conspicuous, the information (the color and pattern of the background) extracted from the drawing information of the opposite page may be synthesized or predetermined background information (an inconspicuous color or pattern) may be synthesized.

Further, in the above explanation, the shift amount of each page of the two spread pages is made equal, however, for example, on the page on the curved side, to make the drawing information in the neighborhood of the folding line 32 visible, the shift amount of each page may be changed such that the shift amount is made larger than that of the opposite page.

Embodiment 2

Figure 11:
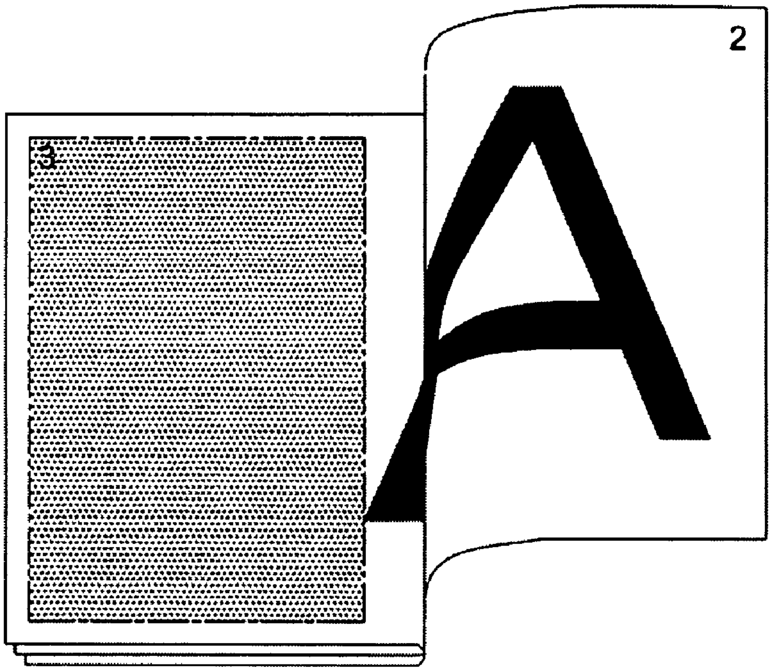
FIGS. 11 (*a*) and 11(*b*) are a perspective view and a front view showing the external configuration of the booklet-shaped prints relating to the second embodiment of the present invention.
Figure 11:
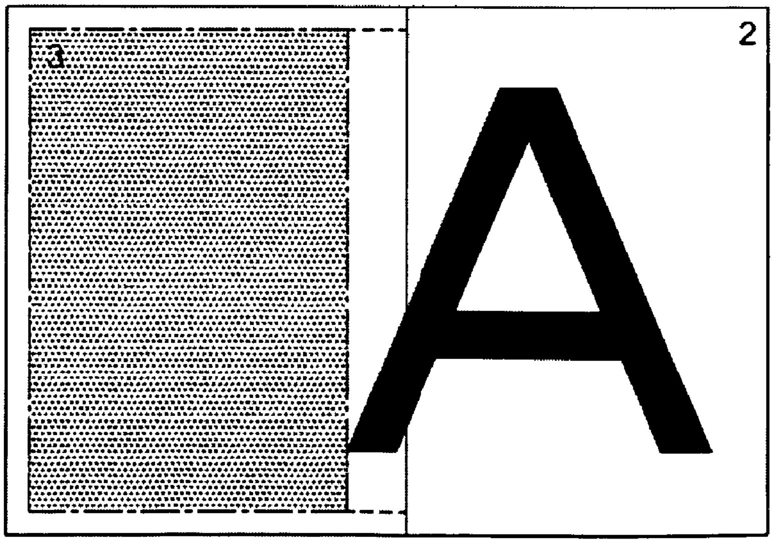
Figure 12:
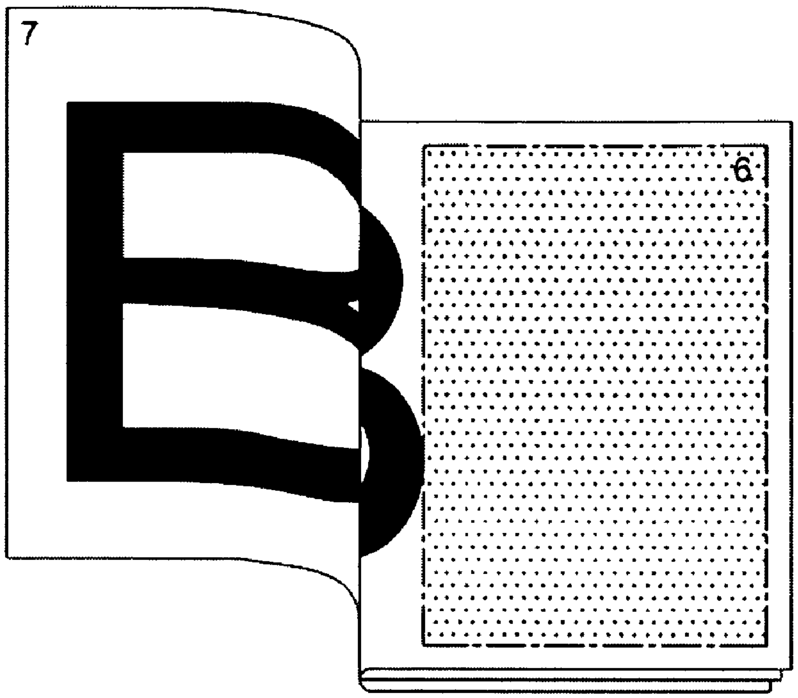
FIGS. 12(*a*) and 12(*b*) are a perspective view and a front view showing the external configuration of the booklet-shaped prints relating to the second embodiment of the present invention.
Figure 12:
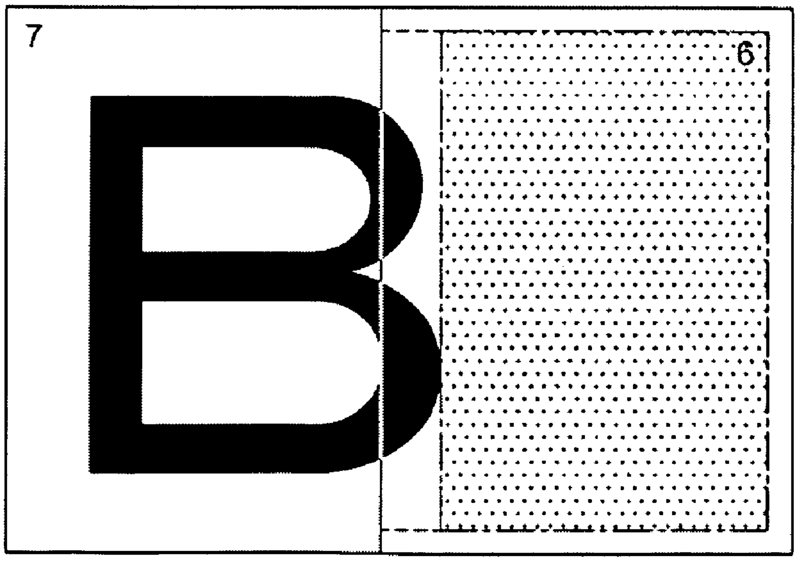
Figure 15:
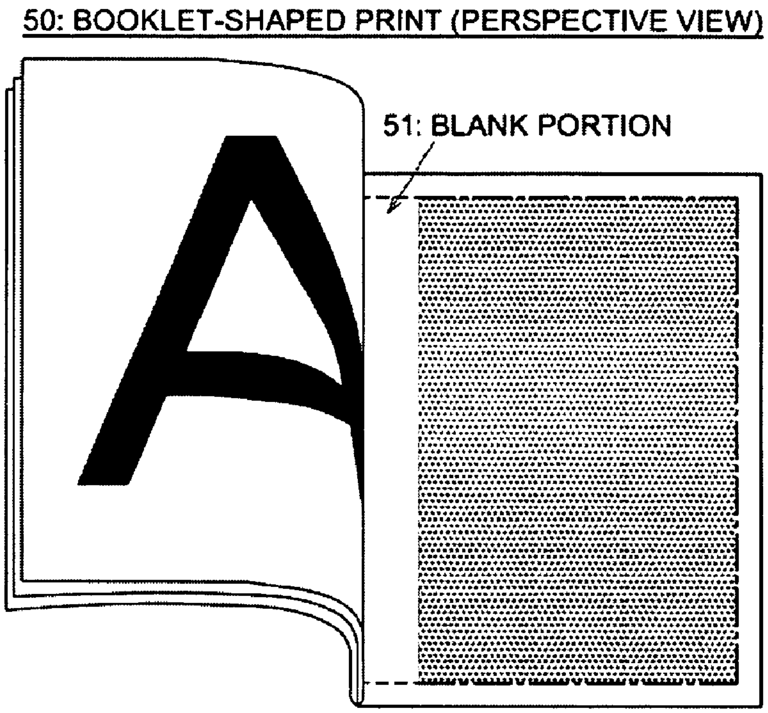
FIGS. 15(*a*) and 15(*b*) are perspective views showing the external configuration (when the radius of curvature of the curve is large) of conventional booklet-shaped prints.
Figure 15:
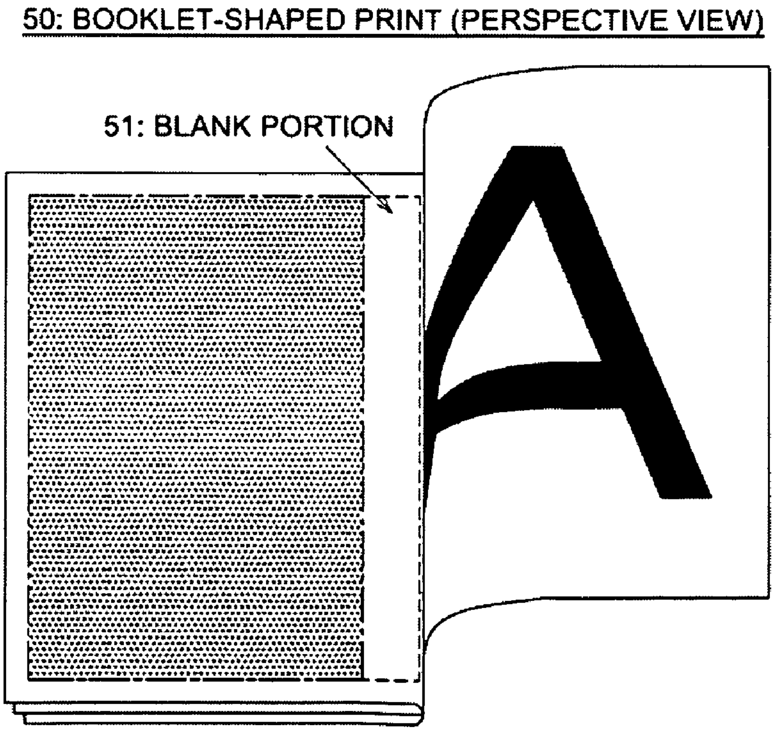

Next, the image forming apparatus, imposition method for booklet-shaped prints, and booklet-shaped prints relating to the second embodiment of the present invention will be explained by referring to FIGS. 10 to 13. FIG. 10 is a drawing showing schematically the shift process and synthesis process of the booklet-shaped prints of this embodiment, and FIGS. 11 and 12 are drawings showing the external configuration of the booklet-shaped prints of this embodiment. Further, FIG. 13 is a drawing showing an example of the rules of the shift process and synthesis process.

In the first embodiment aforementioned, the case that the side where there are more remaining pages when the prints are spread is curved is indicated, however, for example, when putting the booklet-shaped prints 30 on a desk and reading them by turning page by page, the sheets on the side where the pages are turned may be curved at a large radius of curvature.

Therefore, in this embodiment, as shown in FIG. 10(*a*), using the shifting section, the shift process of shifting outside the drawing information of each page (in this case, pages 2, 3, 6, and 7) of the two spread pages excluding the center so as to be separated from the folding line 32 and forming the blank portion 33 in the neighborhood of the folding line 32 is performed and as shown in FIG. 10(*b*), using the synthesizing section, the synthesis process of extracting the drawing information (in the drawing, the information at the left end of the letter "A" on page 2 or the information at the right end of the letter "B" on page 7) in the neighborhood of the side of the folding line 32 of the pages (in this case, pages 2 and 7) which are curved at a large radius of curvature and are deteriorated in the visibility and synthesizing the extracted information in the blank portions 33 of the pages (in this case, pages 3 and 6) on the opposite side of the concerned pages is performed.

By performing the two processes, as shown in FIG. 11(*a*), the neighborhood of the folding line 32 of the second page is curved at a large radius of curvature and a part of the drawing information (in this case, the left end of the letter "A") cannot be seen, however the part of the drawing information can be confirmed on page 3 on the opposite side, so that the visibility can be improved drastically. Further, in the blank portion 33 of page 3, the drawing information on page 2 is synthesized, so that the appearance can be improved particularly. Further, when viewing obliquely the booklet-shaped prints 30, as shown in FIG. 11(*a*), the drawing information of page 2 and the drawing information of page 3 are seen so as to be shifted to some degree, however when viewing the booklet-shaped prints 30 from front, as shown in FIG. 11(*b*), the shift can be canceled.

Similarly, as shown in FIG. 12(*a*), the neighborhood of the folding line 32 of the seventh page is curved at a large radius of curvature and a part of the drawing information (in this case, the right end of the letter "B") cannot be seen, however the part of the drawing information can be confirmed on page 6 on the opposite side, so that the visibility can be improved drastically. In the blank portion 33 of page 6, the drawing information on page 7 is synthesized, so that the appearance can be improved drastically. Further, when viewing the booklet-shaped prints 30 from front, the shift can be canceled.

Further, in FIGS. 10 to 12, the case that the sheets 31 are folded and are bound in a book is shown, though similarly to the first embodiment, this process can be applied to the case that sheets are stacked up without folding and are bound at one end.

Next, an example of the shift process and synthesis process of the booklet-shaped prints 30 will be explained specifically.

Firstly, the controller 11 acquires the basis weight corresponding to the sheets selected by the print data, refers to the table stored beforehand in the memory 11*b* or HDD 11*c*, and decides the reference shift amount for deciding how much to change the shift amount of the drawing information per each page. Next, the controller 11 analyzes the print data, acquires the number of pages, and judges whether the number of pages is a predetermined value or larger.

And, when the number of pages is a predetermined value (in this case, 8) or larger, the shifting section calculates the shift amount per page according to a predetermined rule and shifts outside the drawing information of each page so as to be separated from the folding line. FIG. 13 shows an example of the rule for deciding the shift amount of each page hinged.

For example, similarly to the first embodiment, in the explanation on the assumption of the page configuration shown in FIG. 10 under the condition that the basis weight of sheets used is 81 to 105 $g/m^2$ and the reference shift amount d is 0.18 mm as shown in FIG. 8, when the number of pages is 8, the drawing information on pages 2 and 6 is shifted respectively by 0.18 mm in the right direction and the drawing information on pages 3 and 7 is shifted respectively by 0.18 mm in the left direction. Further, when the number of pages is 12, the drawing information on pages 2 and 10 is shifted respectively by 2×0.18=0.36 mm in the right direction and the drawing information on pages 4 and 8 is shifted respectively by 0.18 mm in the right direction. Further, the drawing information on pages 3 and 11 is shifted respectively by 0.36 mm in the left direction and the drawing information on pages 5 and 9 is shifted respectively by 0.18 mm in the left direction.

When it is generalized, if the number of pages is N (N is a multiple of 4 such as 8 or more), the drawing information on pages 2n and N−2n (n is an integer of 1 or more and less than N/4) is shifted respectively by d×(N/4−n) in the right direction and the drawing information on pages 2n+1 and N−2n+1 is shifted respectively by d×(N/4−n) in the left direction.

Next, the synthesizing section extracts the drawing information to be synthesized on a predetermined page from the opposite page.

For example, when explaining the case that similarly, sheets of a basis weight of 81 to 105 $g/m^2$ are used and the reference shift amount d is 0.18 mm, if the number of pages is 8, the drawing information at a distance of 0.18 mm from the left end of page 2 is extracted as drawing information to be synthesized on page 3, and the drawing information at a distance of 0.18 mm from the right end of page 7 is extracted as drawing information to be synthesized on page 6. Further, when the number of pages is 12, the drawing information at a distance of 2×0.18=0.36 mm from the left end of page 2 is extracted as drawing information to be synthesized on page 3 and the drawing information at a distance of 0.18 mm from the left end of page 4 is extracted as drawing information to be synthesized on page 5. Further, the drawing information at a distance of 0.36 mm from the right end of page 11 is extracted as drawing information to be synthesized on page 10 and the drawing information at a distance of 0.18 mm from the right end of page 9 is extracted as drawing information to be synthesized on page 8.

When it is generalized similarly, the drawing information at a distance of d×(N/4−n) from the left end of page 2n is extracted as drawing information to be synthesized on page 2n+1 and the drawing information at a distance of d×(N/4−n) from the right end of page N−2n+1 is extracted as drawing information to be synthesized on page N−2n.

And, the synthesizing section synthesizes the extracted drawing information in the blank portion of the opposite page.

For example, when the number of pages is 8, the drawing information on the left side of page 2 is synthesized in the blank portion on the right side of page 3 and the drawing information on the right side of page 7 is synthesized in the blank portion on the left side of page 6. Further, when the number of pages is 12, the drawing information on the left side of page 2 is synthesized in the blank portion on the right side of page 3 and the drawing information on the left side of page 4 is synthesized in the blank portion on the right side of page 5. Further, the drawing information on the right side of page 11 is synthesized in the blank portion on the left side of page 10 and the drawing information on the right side of page 9 is synthesized in the blank portion on the left side of page 8.

When it is generalized similarly, the drawing information on the left side of page 2n is synthesized in the blank portion on the right side of page 2n+1 and the drawing information on the right side of page N−2n+1 is synthesized in the blank portion on the left side of page N−2n.

Further, the shift process and synthesis process are described above on the assumption of the page configuration shown in FIG. 10 and similarly to the first embodiment, when counting the number of pages in the opposite direction, it is desirable to consider by reversing the left and right. Further, when not counting the front cover sheet and back cover sheet respectively as one page, it is desirable to assume the value obtained by subtracting one from each page number as a page number.

As mentioned above, in this embodiment, when bookbinding printing at a number of pages which is a predetermined value or more is instructed, the shifting section, according to a predetermined rule, shifts the drawing information of each page of the two spread pages outside so as to be separated from the folding line and the synthesizing section performs a process of synthesizing the drawing information in the neighborhood of the folding line side where there are less remaining pages when the pages are spread in the blank portion in the neighborhood of the folding line of the opposite page, as shown in FIGS. 11 and 12, even if the sheets are curved at a large radius of curvature, the visibility of the drawing information on the curved page can be improved particularly and the blank portion is filled out, thus the appearance can be improved drastically.

Further, even in this embodiment, for the spread page having no drawing information in the neighborhood of the folding line 32, there is no need to execute the shift process and synthesis process. Further, a part of the drawing information may be shifted and arranged along the folding line (for example, shifted upward), or the drawing information may be enlarged and synthesized at a predetermined ratio, and a part of the drawing information may be synthesized repeatedly. Further, the color and pattern of the background extracted from the drawing information may be synthesized and predetermined background information (an inconspicuous color or pattern) may be synthesized. Further, the shift amount of each page of the two spread pages may be changed.

Further, in the first embodiment, the case that the drawing information in the neighborhood of the folding line side where there are more remaining pages is synthesized in the blank portion in the neighborhood of the folding line of the opposite page is described, and in the second embodiment, the case that the drawing information in the neighborhood of the folding line side where there are less remaining pages is synthesized in the blank portion in the neighborhood of the folding line of the opposite page is described, however a configuration may be used that these cases are combined, thus the drawing information in the neighborhood of the folding line side of each of the pages where there are more and less remaining pages is synthesized in the blank portion in the neighborhood of the folding line of the opposite page.

Further, in each embodiment aforementioned, the configuration that the shift process and synthesis process are not performed for the central spread pages is used, though for example, when flat binding or wireless binding is adopted as a bookbinding method, the visibility of the drawing information of the central pages may be deteriorated, so that for the central spread pages, the shift process and synthesis process may be performed. In this case, the numbers of remaining pages on both sides are the same, so that it is desirable to synthesize the drawing information in the neighborhood of the folding line side of each page in the blank portion in the neighborhood of the folding line of the opposite page.

INDUSTRIAL APPLICABILITY

The present invention can be used for an apparatus for making optional prints bound in a book, an imposition method for the prints, and the prints.

What is claimed is:

1. An image forming apparatus comprising:
   - an image output section which binds a plurality of sheets, both sides of each of which have been printed, and outputs a booklet-shaped print; and
   - a controller provided with a processing unit and a memory, the controller comprising:
     - a shifting section which shifts drawing information to be printed on each page of at least one set of spread two pages of the booklet-shaped print so that the drawing information is separated from a bound position; and
     - a synthesizing section which synthesizes drawing information near a bound side of one page of the two pages, information based on the drawing information, or predetermined background information, in a blank portion formed by a shift on a bound side of an other page of the two pages,
   - wherein, when a number of pages of the plurality of sheets is a predetermined value or larger, and
   - the shifting section shifts the drawing information on each page of at least one set of spread two pages of the booklet-shaped print so that the drawing information is separated from the bound position; and
   - the synthesizing section synthesizes drawing information near the bound side of one page of the two pages, information based on the drawing information, or predetermined background information, or in a blank portion formed by a shift on a bound side of an other page of the two pages, and
   - when the number of pages of the plurality of sheets is less than the predetermined value, the shifting section does not perform the shifting and the synthesizing section does not perform the synthesizing.

2. The image forming apparatus according to claim 1, wherein, when the one set of the two pages is spread, more numbers of pages exist at a side of the one page than the side of the other page.

3. The image forming apparatus according to claim 1, wherein, when the one set of the two pages is spread, fewer numbers of pages exist at a side of the one page than the side of the other page.

4. The image forming apparatus according to claim 1, wherein the shift on the bound side of an other page of the two pages is performed by the shifting section.

5. An image forming apparatus comprising:
   - an image output section which folds at a folding line, binding a plurality of sheets, both sides of each of which have been printed, and outputting a booklet-shaped print; and
   - a controller provided with a processing unit and a memory, the controller comprising:
     - a shifting section which shifts drawing information to be printed on each page of at least one set of spread two pages other than central pages of the booklet-shaped print so that the drawing information is separated from a bound position; and
     - a synthesizing section which synthesizes the drawing information near a bound side of one page of the two pages, information based on the drawing information, or predetermined background information, in a blank portion formed by a shift on a bound side of an other page of the two pages,
   - wherein, when a number of pages of the plurality of sheets is a predetermined value or larger,
   - the shifting section shifts the drawing information on each page of at least one set of spread two pages of the booklet-shaped print so that the drawing information is separated from the bound position; and
   - the synthesizing section synthesizes drawing information near the bound side of one page of the two pages, information based on the drawing information, or predetermined background information, in a blank portion formed by a shift on a bound side of an other page of the two pages, and
   - when the number of pages of the plurality of sheets is less than the predetermined value, the shifting section does not perform the shifting and the synthesizing section does not perform the synthesizing.

6. The image forming apparatus according to claim 5, wherein, when the one set of the two pages is spread, more numbers of pages exist at a side of the one page than the side of the other page.

7. The image forming apparatus according to claim 5, wherein, when the one set of the two pages is spread, fewer numbers of pages exist at a side of the one page than the side of the other page.

8. An imposition method for a booklet-shaped print in an image forming apparatus binding a plurality of sheets, both sides of each of which have been printed, and outputting the booklet-shaped print, the imposition method comprising:
   - shifting drawing information to be printed on each page of at least one set of spread two pages of the booklet-shaped print so that drawing information is separated from a bound position; and
   - synthesizing the drawing information near a bound side of one page of the two pages, information based on the drawing information, or predetermined background information, in a blank portion formed by a shift on a bound side of an other page of the two pages, wherein, when a number of pages of the plurality of sheets is a predetermined value or larger, the method executes the steps of shifting and synthesizing, and when the number of pages of the plurality of sheets is less than the predetermined value, the method does not execute the steps of shifting and synthesizing.

9. The imposition method according to claim 8, wherein, when the one set of the two pages is spread, more numbers of pages exist at a side of the one page than the side of the other page.

10. The imposition method according to claim 8, wherein, when the one set of the two pages is spread, fewer numbers of pages exist at a side of the one page than the side of the other page.

11. An imposition method for a booklet-shaped print in an image forming apparatus folding at a folding line, binding a plurality of sheets, both sides of each of which have been printed, and outputting the booklet-shaped print, the imposition method comprising:

shifting drawing information to be printed on each page of at least one set of spread two pages other than central pages of the booklet-shaped print so that the drawing information is separated from a bound position; and synthesizing the drawing information near a bound side of one page of the two pages, information based on the drawing information, or predetermined background information, in a blank portion formed by a shift on the bound side of an other page of the two pages, wherein, when a number of pages of the plurality of sheets is a predetermined value or larger, the method executes the steps of shifting and synthesizing, and when the number of pages of the plurality of sheets is less than the predetermined value, the method does not execute the steps of shifting and synthesizing.

12. The imposition method according to claim 11, wherein, when the one set of the two pages is spread, more numbers of pages exist at a side of the one page than the side of the other page.

13. The imposition method according to claim 11, wherein, when the one set of the two pages is spread, fewer numbers of pages exist at a side of the one page than the side of the other page.

* * * * *